United States Patent
Baughman et al.

(10) Patent No.: US 10,067,935 B2
(45) Date of Patent: *Sep. 4, 2018

(54) PREDICTION AND OPTIMIZED PREVENTION OF BULLYING AND OTHER COUNTERPRODUCTIVE INTERACTIONS IN LIVE AND VIRTUAL MEETING CONTEXTS

(71) Applicant: International Business Machines Corporation, Armonk, NY (US)

(72) Inventors: Aaron K. Baughman, Silver Spring, MD (US); James R. Kozloski, New Fairfield, CT (US); Timothy M. Lynar, Kew (AU); Suraj Pandey, Parkville (AU); John M. Wagner, Carlton (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/955,657

(22) Filed: Dec. 1, 2015

(65) Prior Publication Data

US 2017/0132209 A1     May 11, 2017

Related U.S. Application Data

(63) Continuation of application No. 14/933,646, filed on Nov. 5, 2015.

(51) Int. Cl.
    *G06F 17/20*     (2006.01)
    *G06F 17/28*     (2006.01)
(Continued)

(52) U.S. Cl.
    CPC ........ *G06F 17/2818* (2013.01); *G06F 17/271* (2013.01); *G06F 17/2785* (2013.01); *H04L 67/22* (2013.01)

(58) Field of Classification Search
    CPC ...... G06F 17/20; G06F 17/21; G06F 17/2247; G06F 17/227; G06F 17/228; G06F 17/27;
(Continued)

(56) References Cited

U.S. PATENT DOCUMENTS

| | | | | |
|---|---|---|---|---|
| 7,444,403 B1 * | 10/2008 | Packer | ................ | G06F 21/6218 704/9 |
| 2006/0095264 A1 * | 5/2006 | Wu | ........................ | G10L 13/06 704/260 |

(Continued)

OTHER PUBLICATIONS

Baughman et al., "Prediction and Optimized Prevention of Bullying and Other Counterproductive Interactions in Live and Virtual Meeting Contexts," U.S. Appl. No. 14/933,646, filed Nov. 5, 2015.

(Continued)

*Primary Examiner* — Qi Han
(74) *Attorney, Agent, or Firm* — Cantor Colburn LLP

(57) ABSTRACT

Embodiments are directed to a computer implemented counterproductive interaction identification system. The system includes an electronic tool configured to hold data of a user, and an analyzer circuit configured to derive a cognitive trait of the user based at least in part on the data of the user. The system further includes a decision engine configured to determine, based at least in part on the derived cognitive trait of the user, that the user is a target or a source of an actual or an impending counterproductive interaction.

7 Claims, 10 Drawing Sheets

(51) Int. Cl.
*G06F 17/27* (2006.01)
*H04L 29/08* (2006.01)

(58) Field of Classification Search
CPC ............... G06F 17/2705; G06F 17/271; G06F 17/2715; G06F 17/274; G06F 17/2765; G06F 17/277; G06F 17/2775; G06F 17/2785; G06F 17/2795; G06F 17/28; G06F 17/2818; G06F 17/2872
USPC .................................. 704/9, 1, 2, 3, 4, 7, 10
See application file for complete search history.

(56) References Cited

U.S. PATENT DOCUMENTS

| | | | |
|---|---|---|---|
| 2011/0238410 A1* | 9/2011 | Larcheveque | G06F 17/2785 704/9 |
| 2013/0013291 A1* | 1/2013 | Bullock | G06F 17/2785 704/9 |
| 2014/0040154 A1* | 2/2014 | Webb | G06Q 90/00 705/325 |
| 2015/0249584 A1* | 9/2015 | Cherifi | H04L 43/065 709/224 |

OTHER PUBLICATIONS

List of IBM Patents or Patent Applications Treated As Related; Date Filed: Dec. 1, 2015, 2 pages.

* cited by examiner

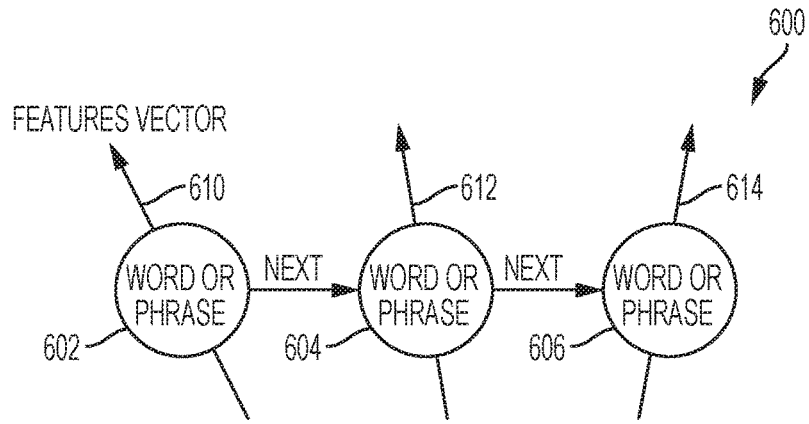
FIG. 6A
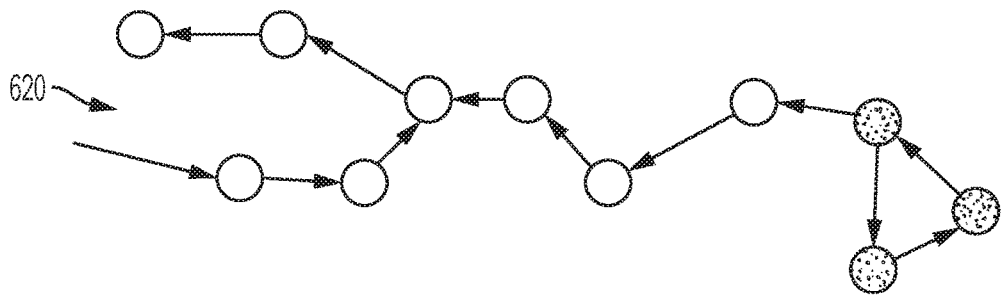
FIG. 6B
$(0,1,0,0...)$  VECTOR A
$sim(a,b) = W_a \cdot W_b$  EQUATION B
$G = \{N,E,W\}$  EQUATION C
$W = W_{syn} \oplus W_{sem} \oplus W_{ntxt}$  EQUATION D
$G_{sk} = \{N,E\}$  EQUATION E
$H = \sum_n E_{nm} W_n W_m$  EQUATION F
$M = M(F_{brain}, C_{brain})$  EQUATION G
$C(sample) = M(F_{sample})$  EQUATION H
FIG. 7

$$f(\chi;\alpha;\beta)$$

$$= \frac{\Gamma(\alpha+\beta)}{\Gamma(\alpha)\Gamma(\beta)} \chi^{\alpha-1}(1-\chi)^{\beta-1}$$

$$= \frac{1}{B(\alpha,\beta)} \chi^{\alpha-1}(1-\chi)^{\beta-1}$$

$$\hat{\alpha} = \overline{\chi}\left(\frac{\overline{\chi}(1-\overline{\chi})}{\overline{\upsilon}} - 1\right), \text{CONDITIONAL ON } \overline{\upsilon} < \overline{\chi}(1-\overline{\chi}),$$

$$\hat{\beta} = (1-\overline{\chi})\left(\frac{\overline{\chi}(1-\overline{\chi})}{\overline{\upsilon}} - 1\right), \text{CONDITIONAL ON } \overline{\upsilon} < \overline{\chi}(1-\overline{\chi}).$$

FIG. 9A

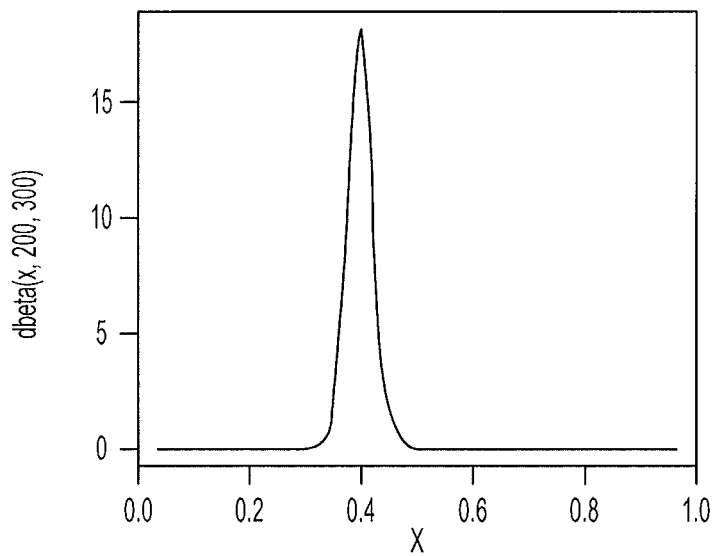

FIG. 9B

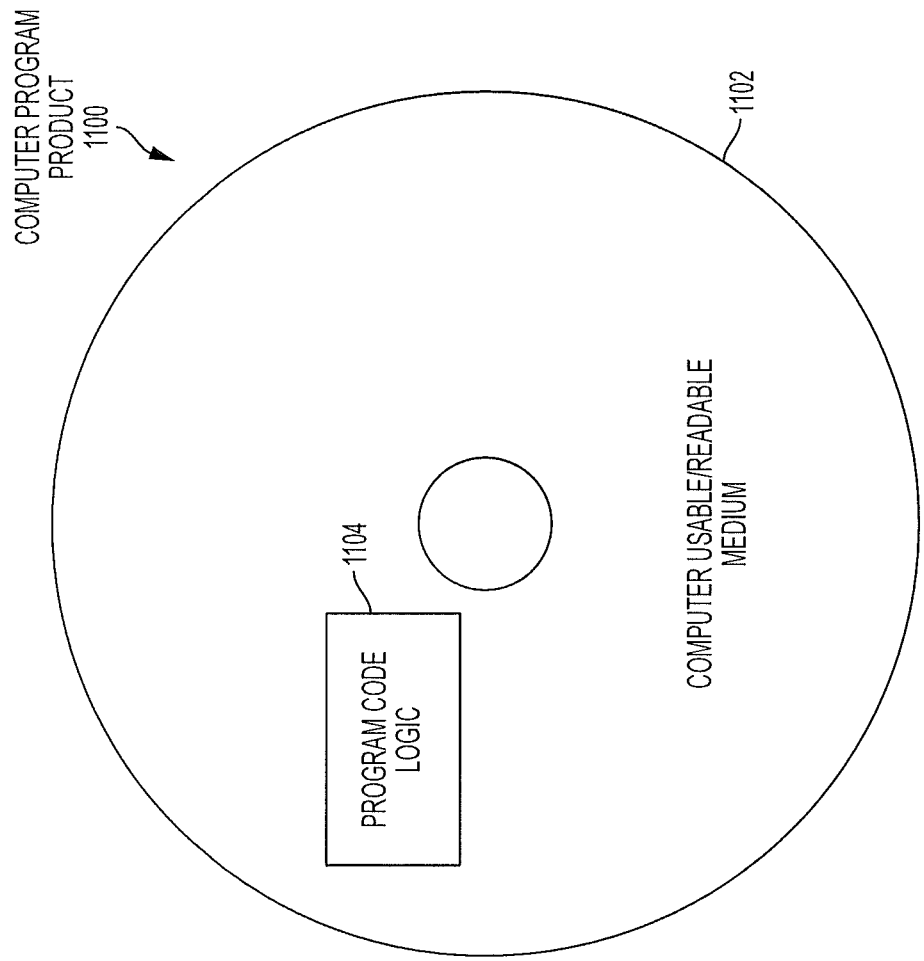

PREDICTION AND OPTIMIZED PREVENTION OF BULLYING AND OTHER COUNTERPRODUCTIVE INTERACTIONS IN LIVE AND VIRTUAL MEETING CONTEXTS

DOMESTIC PRIORITY

The present application claims priority to U.S. Nonprovisional application Ser. No. 14/933,646 filed on Nov. 5, 2015 titled "PREDICTION AND OPTIMIZED PREVENTION OF BULLYING AND OTHER COUNTERPRODUCTIVE INTERACTIONS IN LINE AND VIRTUAL MEETING CONTEXTS," assigned to the assignee hereof and expressly incorporated by reference herein.

BACKGROUND

The present disclosure relates in general to the facilitation of effective meetings. More specifically, the present disclosure relates to systems and methodologies for facilitating the prediction and identification of targets and sources of bullying and other counterproductive interactions in live and virtual meeting contexts based at least in part on the identification and analysis of predictive cognitive traits of meeting participants.

Every organization, whether it has 2 members or 2,000, relies on live, virtual and hybrid live/virtual meetings as a regular part of conducting operations. In a team-focused environment, team meetings facilitate input from a variety of perspectives and people. Given the diversity of personalities, temperaments and communication styles among members of a typical team, it is inevitable that some interactions between team members will be counterproductive to the short term goals of the particular meeting, as well as the long term goals of the team.

Bullying is a common form of counterproductive interaction in a meeting. Bullying behavior can take a variety of forms, including for example interrupting, interrogating and intimidating other meeting attendees. Bullying behavior causes disruption and a less productive work environment both inside and outside of the meeting room. The meeting climate created by a bully increases stress on targets of the bullying behavior, and prevents other team members from contributing to group discussions or suggesting new perspectives.

Team leaders have ultimate responsibility for managing team effectiveness, which includes the identification and removal of counterproductive behaviors and interactions from team meetings. Team leaders are often trained to apply strategies designed to identify and remove counterproductive meeting behavior and interactions. While some forms of counterproductive behavior and interaction are overt, other forms are subtle and more difficult to detect. For example, bullying can be expressed through passive aggressive acts (e.g., pretending not to see, hear or remember requests), which are chosen to deliberately mask the aggressive intentions of the bully. Similarly, some team members who are the target of bullying behavior may exhibit overt and easily identified signs of discomfort, while other team members who are the target of bullying behavior may exhibit subtle and more difficult to detect signs of discomfort.

It would be beneficial to provide team leaders with systems and methodologies for facilitating, in live and virtual meeting contexts, the prediction and identification of targets and sources of counterproductive behavior, as well as the identification and optimized prevention of counterproductive interactions.

SUMMARY

Embodiments are directed to a computer implemented counterproductive interaction identification system. The system includes an electronic tool configured to hold data of a user, and an analyzer circuit configured to derive a cognitive trait of the user based at least in part on the data of the user. The system further includes a decision engine configured to determine, based at least in part on the derived cognitive trait of the user, that the user is a target or a source of an actual or an impending counterproductive interaction.

Embodiments are further directed to a computer implemented method of identifying counterproductive interaction. The method includes receiving data of a user, deriving a cognitive trait of the user based at least in part on the data of the user, and determining, based at least in part on the derived cognitive trait of the user, that the user is a target or a source of an actual or an impending counterproductive interaction.

Embodiments are further directed to a computer program product for identifying counterproductive interactions. The computer program product includes a computer readable storage medium having program instructions embodied therewith, wherein the computer readable storage medium is not a transitory signal per se. The program instructions are readable by a processor system to cause the processor system to perform a method. The method includes receiving data of a user, deriving a cognitive trait of the user based at least in part on the data of the user, and determining, based at least in part on the derived cognitive trait of the user, that the user is a target or a source of an actual or an impending counterproductive interaction.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 6A depicts a graphical text analyzer's output feature vector comprising an ordered set of words or phrases, wherein each is represented by its own vector according to one or more embodiments;

FIG. 6B depicts a graph of communications according to one or more embodiments of the disclosure;

FIG. 7 depicts various vectors and equations illustrating a core algorithm of a graphical text analyzer in accordance with one or more embodiments;

FIG. 9A depicts equations of a beta distribution analysis according to one or more embodiments;

FIG. 9B depicts a curve illustrating a example of a beta distribution according to one or more embodiments;

FIG. 11 depicts a diagram of a computer program product according to one or more embodiments.

Figure 1:
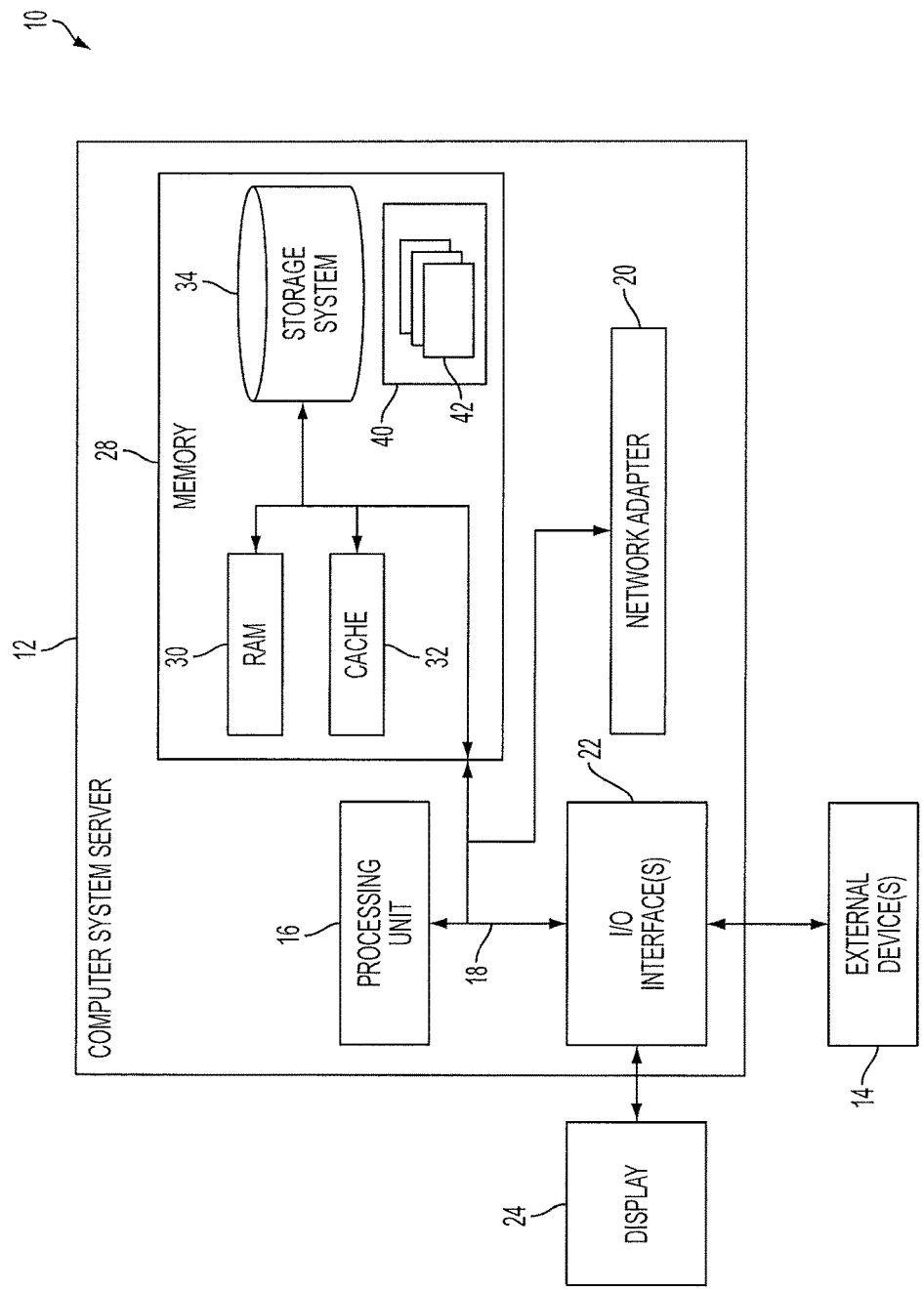
FIG. 1 depicts a cloud computing node according to one or more embodiments.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Additionally, although this disclosure includes a detailed description of analyzing text in order to derive predictive cognitive traits to facilitate the prediction and identification in live and virtual meeting contexts of targets and sources of counterproductive behavior, as well as the identification and optimized prevention of counterproductive interactions, implementation of the teachings recited herein are not limited strictly the interactions that occur in meetings. Rather, embodiments of the present disclosure are capable of being implemented in conjunction with any other type of collaborative environment, now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
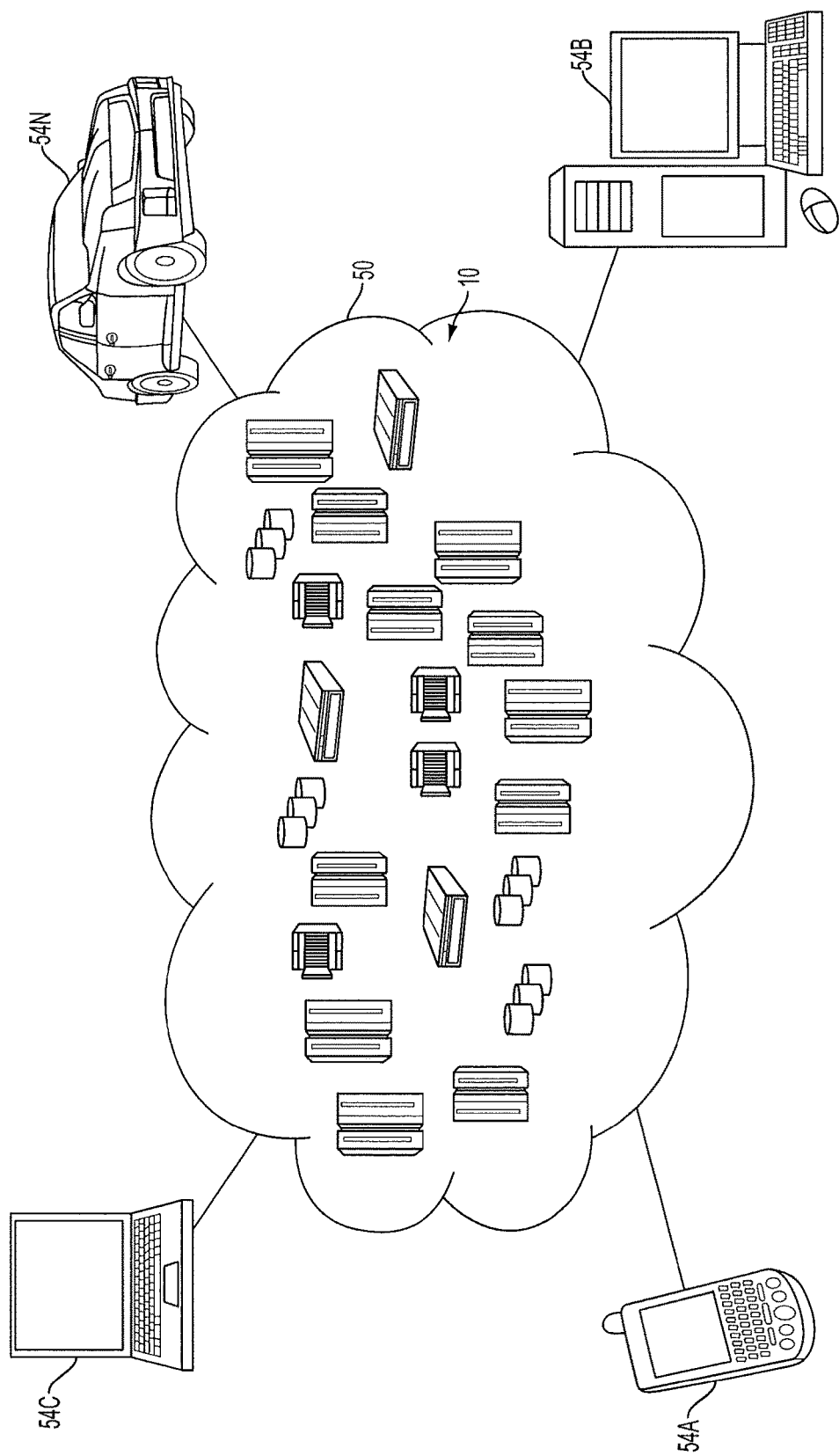
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
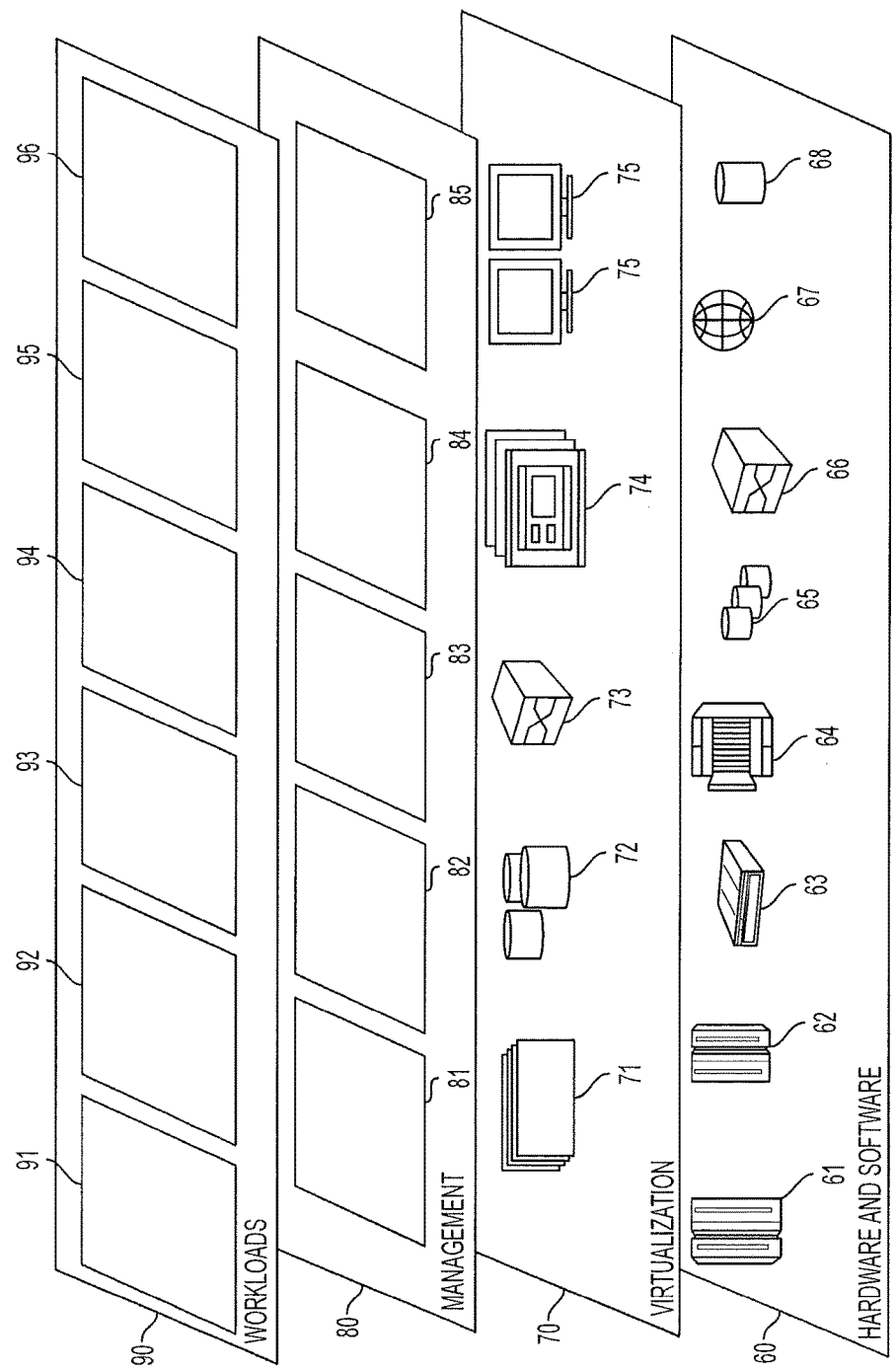
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a predictive cognitive trait based module 96 for facilitating the prediction and optimized prevention of bullying and other counterproductive interactions in live and virtual meeting contexts.

As previously noted herein, team leaders have ultimate responsibility for managing all aspects of team effectiveness, including the identification and removal of counterproductive behaviors and interactions from their team meetings. Team leaders are often trained to apply strategies designed to identify and remove counterproductive meeting behavior and interactions. While some forms of counterproductive behavior and interaction are overt, other forms are subtle and more difficult for a team leader to detect. For example, bullying can be expressed through passive aggressive acts (e.g., pretending not to see, hear or remember requests), which are chosen to deliberately mask the aggressive intentions of the bully. Similarly, some team members who are the target of bullying behavior may exhibit overt and easily identified signs of discomfort, while other team members who are the target of bullying behavior may exhibit subtle and more difficult to detect signs of discomfort. Accordingly, it would be beneficial to provide team leaders with systems and methodologies for facilitating in live and virtual meeting contexts the prediction and identification of targets and sources of counterproductive behavior, as well as the identification and optimized prevention of counterproductive interactions.

The present disclosure provides systems and methodologies for facilitating the prediction and identification of targets and sources of bullying and other counterproductive interactions in live and virtual meeting contexts based at least in part on the identification and analysis of predictive cognitive traits of meeting participants. As used in the present disclosure, a cognitive trait is defined as a representation of measures of a user's total behavior over some period of time (including musculoskeletal gestures, speech gestures, eye movements, internal physiological changes, measured by imaging devices, microphones, physiological and kinematic sensors in a high dimensional measurement space) within a lower dimensional feature space. One more preferred embodiments use certain feature extraction techniques for identifying certain cognitive traits. Specifically, the reduction of a set of behavioral measures over some period of time to a set of feature nodes and vectors, corresponding to the behavioral measures' representations in the lower dimensional feature space, is used to identify the emergence of a certain cognitive trait over that period of time. The relationship of one feature node to other similar nodes through edges in a graph corresponds to the temporal order of transitions from one set of measures and the feature nodes and vectors to another. Some connected subgraphs of the feature nodes are herein defined as a cognitive trait. The present disclosure describes the analysis, categorization, and identification of these cognitive traits by means of further feature analysis of subgraphs, including dimensionality reduction of the subgraphs, for example by means of graphical analysis, which extracts topological features and categorizes the resultant subgraph and its associated feature nodes and edges within a subgraph feature space.

In one or more embodiments, graphical text analysis is used to identify predictive cognitive traits of meeting attendees. Predictive cognitive traits are used to develop models of each meeting attendee, and a decision engine uses the predictive cognitive trait based models, and optionally other data, to identify and predict various aspects of a developing counterproductive interaction. For example, the decision engine may identify a meeting attendee who has exhibited cognitive traits in the past that make the meeting attendee susceptible to being a target of bullying or other counterproductive interactions during a live meeting. The decision engine may also identify a meeting attendee who is currently exhibiting cognitive traits that suggest the meeting attending is currently experiencing the early stages of being a target of bullying or other counterproductive interactions during a live meeting. The decision engine may also identify a meeting attendee who has exhibited cognitive traits in the past that make the meeting attendee likely to be a source of bullying or other counterproductive behavior during a live meeting. The decision engine may also identify a meeting attendee who is currently exhibiting cognitive traits that suggest the meeting attending is currently exhibiting the early stages of being a source of bullying or other counterproductive behavior during a live meeting. The decision engine may target the interactions of the identified targets and sources of bullying or other counterproductive behavior in a live meeting and recommend mitigating interventions to the team leader.

The decision engine may also utilize a beta distribution to evaluate the various determinations made by the decision engine. The beta distribution is, in effect, a probability of probabilities such that, over time, if the decision engine repeatedly designates a meeting attendee as a bully, the probability range generated by the beta distribution converges toward a more confident number.

The decision engine may also take into account additional information when making a determination that counterproductive interactions are occurring or about to occur in a live meeting. For example, historical attendee models and or historical attendee interactions may be taken into account by the decision engine.

At least the features and combinations of features described in the immediately preceding paragraphs, including the corresponding features and combinations of features depicted in the appended figures amount to significantly more than implementing a method of predicting and preventing bullying and other counterproductive behavior in a particular technological environment. Additionally, at least the features and combinations of features described in the immediately preceding paragraphs, including the corresponding features and combinations of features depicted in the figures, go beyond what is well-understood, routine and conventional in the relevant field(s).

Figure 4:
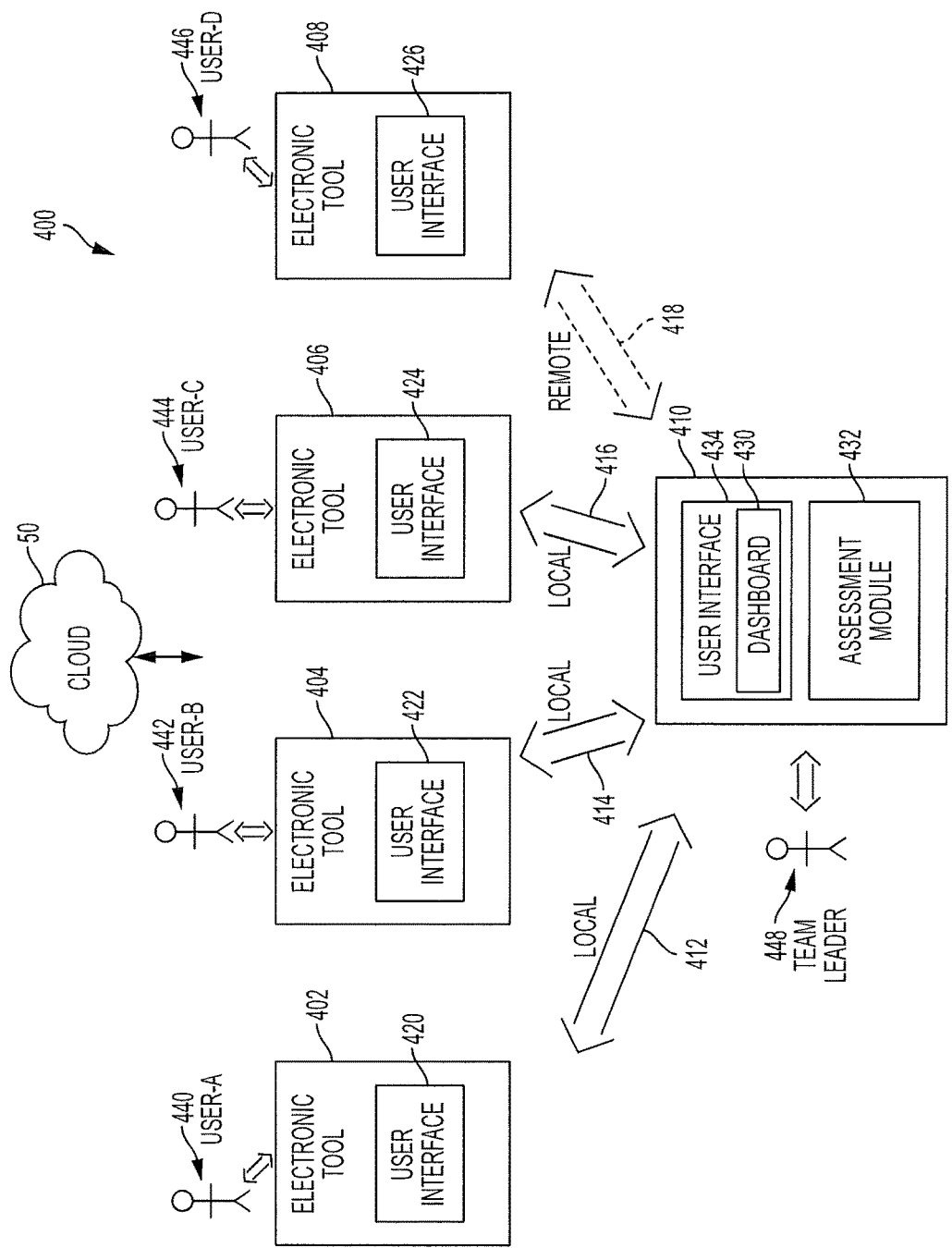
FIG. 4 depicts a diagram illustrating a system according to one or more embodiments.

Turning now to a more detailed description of the present disclosure, FIG. 4 depicts a diagram illustrating a system 400 according to one or more embodiments. System 400 includes a team leader station 410 in communication with local electronic tools/stations 402, 404, 406 and remote electronic tool/station 408 over local communication channels 412, 414, 416 and a remote communication channel 418. The number of local and remote communication channels and electronic tools shown in FIG. 4 are for ease of illustration. It is understood that embodiments of system 400 may include any number of communication channels and/or electronic tools in any combination. Communication channels 412, 414, 416, 418 may be wired or wireless, and some portion of communication channels 412, 414, 416, 418 may route through the internet. Each electronic tool 402, 404, 406, 408 includes a user interface, 420, 422, 424, 426, respectively. Team leader station 410 includes a user interface 434, a dashboard 430 and a counterproductive interaction assessment module 432. Each meeting attendee, namely user-A 440, user-B 442, user-C 444 and user-D 446, is positioned at his/her own electronic tool 402, 404, 406, 408, respectively. A team leader 448 is positioned at his/her own team leader station 410.

A cloud computing system 50 is in wired or wireless electronic communication with one or all of electronic tools 402, 404, 406, 408 and team leader station 410. Cloud 50 may supplement, support or replace some or all of the functionality of electronic tools 402, 404, 406, 408 and team leader station 410. Additionally, some or all of the functionality of electronic tools 402, 404, 406, 408 and team leader station 410 may be implemented as a node 10 (shown in FIGS. 1 and 2) of cloud 50.

System 400 and its method of operation facilitate effective meetings by supporting the prediction and identification of targets and sources of bullying and other counterproductive interactions in live and virtual meeting contexts based at least in part on the identification and analysis of predictive cognitive traits of meeting participants. Electronic tools 402, 404, 406, 408 gather data of meeting attendees, user-A 440, user-B 442, user-C 444 and user-D 446, and provide such data to team leader station 410 for evaluation. Team leader station 410 uses graphical text analysis to analyze the received data and identify predictive cognitive traits of meeting attendees. Team leader station 410 uses the predictive cognitive traits to develop models of each meeting attendee. Team leader station 410 further uses the predictive cognitive trait based models and optionally other data to identify and predict various aspects of a developing counterproductive interaction. For example, team leader station 410 may identify a meeting attendee who has exhibited cognitive traits in the past that make the meeting attendee susceptible to being a target of bullying or other counterproductive interactions during a live meeting. Team leader station 410 may also identify a meeting attendee who is currently exhibiting cognitive traits that suggest the meeting attending is currently experiencing the early stages of being a target of bullying or other counterproductive interactions during a live meeting. Team leader station 410 may also identify a meeting attendee who has exhibited cognitive traits in the past that make the meeting attendee likely to be a source of bullying or other counterproductive behavior during a live meeting. Team leader station 410 may also identify a meeting attendee who is currently exhibiting cognitive traits that suggest the meeting attending is currently exhibiting the early stages of being a source of bullying or other counterproductive behavior during a live meeting. Team leader station 410 may target the interactions of the identified targets and sources of bullying or other counterproductive behavior in a live meeting and recommend mitigating interventions to the team leader.

Team leader station 410 may also utilize a beta distribution to evaluate the various determinations made by team leader station 410. The beta distribution is, in effect, a probability of probabilities such that, over time, if team leader station 410 repeatedly designates a meeting attendee as a bully, the probability range generated by the beta distribution converges toward a more confident number.

Team leader station 410 may also take into account additional information when making a determination that counterproductive interactions are occurring or about to occur in a live meeting. For example, historical attendee models and or historical attendee interactions may be taken into account by team leader station 410.

Figure 5:
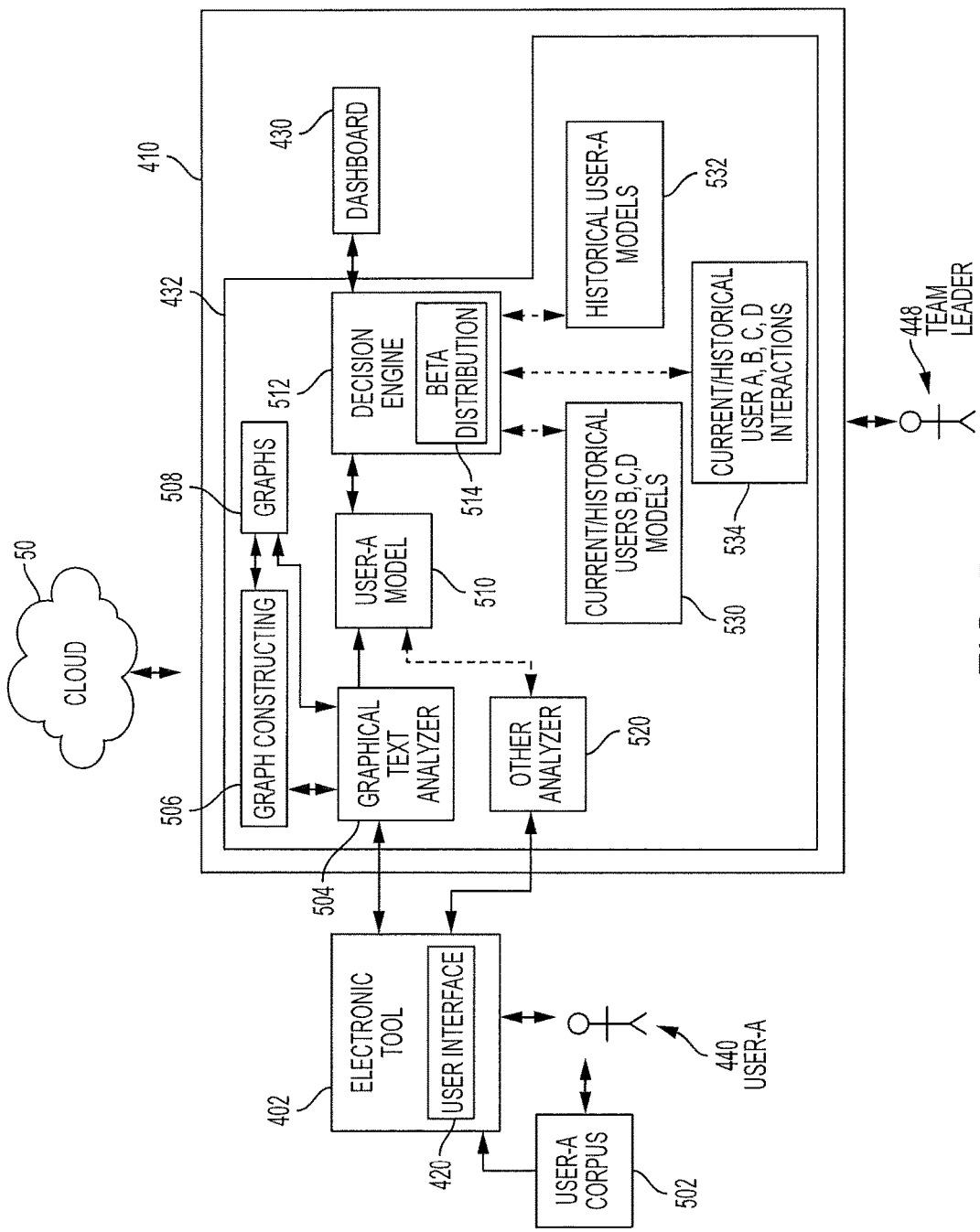
FIG. 5 depicts a diagram illustrating additional detail of a portion of the system shown in FIG. 4.

A more detailed description of the operation of electronic tools 402, 404, 406, 408 and team leader station 410 will now be provided with reference to FIG. 5. FIG. 5 depicts, as an example, a portion of system 400, namely, user-A 440, electronic tool 402, a user-A corpus 502, team leader 448 and team leader station 410. A similar diagram may be developed for user-B 442, electronic tool 402, user-C 444, electronic tool 404, user-D 446 and electronic tool 408 in communication with team leader station 410 and team leader 448. As shown in FIG. 5, assessment module 432 of team leader station 410 includes a graphical text analyzer 504, a graph constructing circuit 506, a graphs repository 508, a user-A model 510, a decision engine 512, an "other" analyzer 520, a current/historical user models of users B, C, D module 530, a current/historical users A, B, C, D interactions module 534 and a historical user-A models module 532, configured and arranged as shown.

User-A is a meeting attendee who interacts with electronic tool 402 in the course of participating in a meeting. For example, user-A will have occasion to speak during the meeting, and electronic tool 402 captures through user interface 420 words spoken by user-A 440. User-A 440 may also have occasion to send written or typed communications during the meeting, including, for example, if user-A has a question for team leader 448 or another meeting attendee and desires to present the question in an online "chat" format. Electronic tool 402 captures through user interface 420 such written communications.

User-A corpus 502 assembles and provides to electronic tool 402 content prepared by or sourced from user-A 440 such as emails (if permitted), prior meeting audio/notes, speeches, articles, interviews, etcetera. Electronic tool 402 also captures the output of user-A corpus 502.

Electronic tool 402 may include all of the functionality of node 10 (shown in FIGS. 1 and 2) of cloud 50. Electronic tool 402 includes functionality that allows it to receive or gather communications (e.g., questions) made by user-A 440 through user interface 420 having a GUI/UX. For instance, electronic tool 402 may include a mobile device such as a smartphone, a smartwatch, a tablet computer, a laptop computer, etcetera, as well as stationary devices such as a desktop computer, a mainframe and the like. User interface 420 may include one or more microphones to receive audio communications made by user-A 440, along with one or more means of receiving textual communications from user-A 440, such as a virtual or physical keyboard or keypad. Electronic tool 402 may also convert any received audio communications into textual communications using one or more now known or later developed speech-to-text techniques.

GUI/UX of user interface 420 provides a user experience (UX), which involves a person's behaviors, attitudes, and emotions about using a particular product, system or service. UX includes the practical, experiential, meaningful and valuable aspects of human-computer interaction. Additionally, UX includes a person's perceptions of system aspects such as utility, ease of use and efficiency. The amount of information that a user is required to enter into a system in order to have that system perform a particular task impacts UX.

Electronic tool 402 assembles the inputs received from user-A corpus 502 and user-A 440 into data of user-A, which includes text data. Graphical text analyzer 504 receives data of user-A, and graph constructing circuit 506 receives data of user-A from graphical text analyzer circuit 504. Graph constructing circuit 506 builds a graph from the received data. More specifically, in some embodiments wherein the received data is text data, the graph constructing circuit 506 extracts syntactic features from the received text and converts the extracted features into vectors, examples of which are shown in FIGS. 6A and 6B and described in greater detail below. These syntactic vectors may have binary components for the syntactic categories such as verb, noun, pronoun, adjective, lexical root, etc. For instance, a vector [0, 1, 0, 0 . . . ] represents a noun-word in some embodiments.

Details of an embodiment of graphical text analyzer 504 will now be provided with reference to FIGS. 6A, 6B, 7 and 8. Referring now to FIG. 6A, there is depicted a graphical text analyzer's output feature vector in the form of a word graph 600 having an ordered set of words or phrases shown as nodes 602, 604, 606, each represented by its own features vector 610, 612, 614 according to one or more embodiments. Each features vector 610, 612, 614 is representative of some additional feature of its corresponding node 602, 604, 606 in some word/feature space. Word graph 600 is useful to extract topological features for certain vectors, for example, all vectors that point in the upper quadrant of the feature space of words. The dimensions of the word/feature space might be parts of speech (verbs, nouns, adjectives), or the dimensions may be locations in a lexicon or an online resource of the semantic categorization of words in a feature space such as WordNet, which is the trade name of a large lexical database of English. In WordNet, nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated with a browser. WordNet is also freely and publicly available for download from the WorldNet website, www.worldnet.princeton.edu. The structure of WordNet makes it a useful tool for computational linguistics and natural language processing.

FIG. 6B illustrates a graph 620 for a group of persons (e.g., two persons depicted as spotted nodes and white nodes). Specifically, for example, the nodes for one person are spotted, and the nodes for another person are depicted in white. The graph 620 may be built for all persons in the group or constructed by combining graphs for individual persons. In some embodiments, the nodes of the graph 620 may be associated with identities of the persons.

Figure 8:
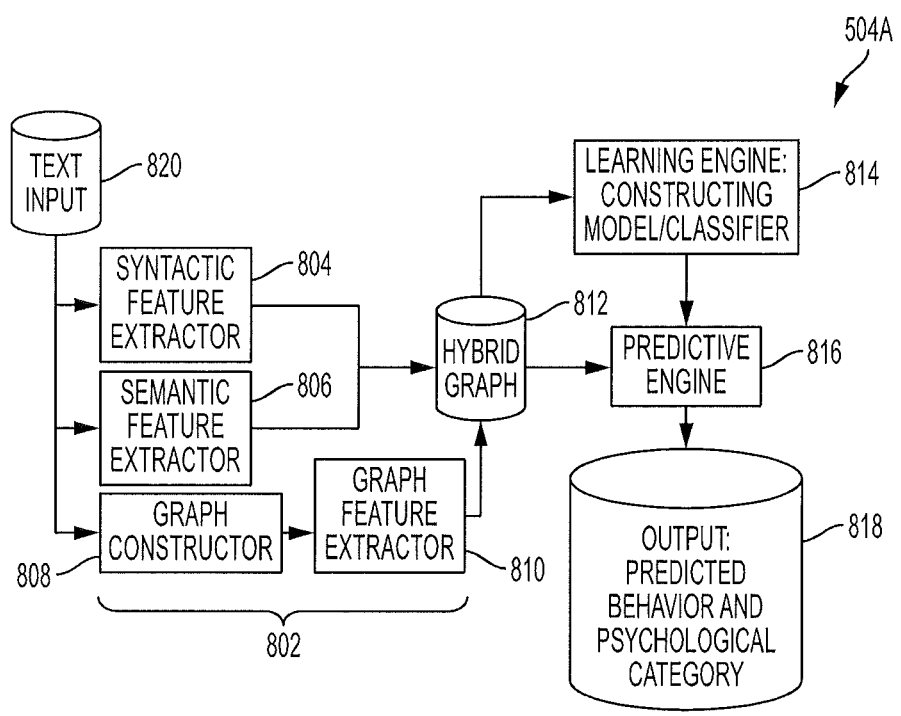
FIG. 8 depicts of a diagram of a graphical text analysis system according to one or more embodiments.

FIG. 7 depicts Vector A and Equations B-H, which illustrate features of a core algorithm that may be implemented by graphical text analyzer 504A (shown in FIG. 8) having a graphical text analysis module 802 (shown in FIG. 8) according to one or more embodiments. Graphical text analyzer 504A shown in FIG. 8 is an implementation of graphical text analyzer 504 (shown in FIG. 5), wherein text input 820 receives text of user-A 440 and/or user-A corpus 502 (shown in FIG. 5). The text received at text input 820 may have been converted from some other form (e.g., speech) to text. The functionality that converts other, non-text data of user-A 440 to text may be provided in electronic tool 402, graphical text analyzer 504 or as a stand-alone circuit.

Continuing with a description of Vector A and Equations B-H of FIG. 7 including selected references to corresponding elements of graphical text analyzer 504A and graphical text analysis module 802 shown in FIG. 8, text or speech-to-text is fed into a standard lexical parser (e.g., syntactic feature extractor 804 of FIG. 8) that extracts syntactic features, which are converted to vectors. Such vectors can have binary components for the syntactic categories verb, noun, pronoun, etcetera, such that the vector represented by Vector A represents a noun word . . . .

The text is also fed into a semantic analyzer (e.g., semantic feature extractor 806 of FIG. 8) that converts words into semantic vectors. The conversion into semantic vectors can be implemented in a number of ways, including, for example, the use of latent semantic analysis. The semantic content of each word is represented by a vector whose components are determined by the singular value decomposition of word co-occurrence frequencies over a large database of documents. As a result, the semantic similarity between two words "a" and "b" can be estimated by the scalar product of their respective semantic vectors represented by Equation B.

A hybrid graph is created in accordance with Equation C in which the nodes "N" represent words or phrases, the edges "E" represent temporal precedence in the speech, and each node possesses a feature vector "W" defined as a direct sum of the syntactic and semantic vectors plus additional non-textual features (e.g. the identity of the speaker) as given by Equation D.

The graph "G" of Equation C is then analyzed based on a variety of features, including standard graph-theoretical topological measures of the graph skeleton as shown by Equation E, such as degree distribution, density of small-size motifs, clustering, centrality, etcetera. Similarly, additional values can be extracted by including the feature vectors attached to each node. One such instance is the magnetization of the generalized Potts model as shown by Equation F such that temporal proximity and feature similarity are taken into account.

The features that incorporate the syntactic, semantic and dynamical components of speech are then combined as a multi-dimensional features vector "F" that represents the speech sample. This feature vector is finally used to train a standard classifier according to Equation G to discriminate speech samples that belong to different conditions "C," such that for each test speech sample the classifier estimates its condition identity based on the extracted features represented by Equation H.

FIG. 8 depicts a diagram of graphical text analyzer 504A having a graphical text analysis module 802 according to one or more embodiments. Graphical text analyzer 504A is an implementation of graphical text analyzer 504 (shown in FIG. 5). Graphical text analyzer 504A includes text input 820, a syntactic feature extractor 804, a semantic feature extractor 806, a graph constructor 808, a graph feature extractor 810, a hybrid graph circuit 812, a learning engine 814, a predictive engine 816 and an output circuit 818, configured and arranged as shown. In general, graphical text analysis module 802 functions to convert inputs from text input circuit 820 into hybrid graphs (e.g., word graph 600 shown in FIG. 6A), which is provided to learning engine 814 and predictive engine 816. In addition to the graphical text analyzer algorithm illustrated in FIG. 7 and described above, additional details of the operation of graphical text analyzer 802 are available in a publication entitled "Speech Graphs Provide A Quantitative Measure Of Thought Disorder In Psychosis," authored by Mota, et al., and published by PLOS ONE, April 2012, Volume 7, Issue 4, the entire disclosure of which is incorporated by reference herein in its entirety.

As noted, graphical text analyzer circuit 802 provides word graph inputs to learning engine 814, and predictive engine 816, which constructs predictive features or model classifiers of the state of the individual in order to predict what the next state will be, i.e., the predicted behavioral or psychological category of output circuit 818. Accordingly, predictive engine 816 and output circuit 818 may be modeled as Markov chains.

Referring again to FIG. 5, user-A model 510 receives cognitive trait data from graphical text analyzer 504 and determines a model 510 of user-A 440 based at least in part on the received cognitive trait data. User-A model 510 is, in effect, a profile of user-A 440 that organizes and assembles the received cognitive trait data into a format suitable for use by decision engine 512. Optionally, the profile generated by user-A model 510 may be augmented by output from "other" analyzer 520, which provides analysis, other than graphical text analysis, of data of user-A 440 input at electronic tool 402. For example, other analyzer 520 may track the specific interactions of user-A 440 with other meeting attendees such as gaze and eye movement interactions, such that user-A model 510 may match received cognitive trait data with specific interactions.

The output of user-A model 510 is provided to decision engine 512, which analyzes the output of user-A model 510 to make a determination, preferably at the earliest stages, of whether or not user-A 440 is currently or is likely to become a target or source of a counterproductive interaction such as bullying. Decision engine 510 may be implemented as a natural language processor (NLP) system that answers natural language questions (e.g., is user-A in the early stages of a counterproductive interaction) by querying data repositories (e.g., a model of user-A 440, user-A corpus 502, etc.) and applying elements of language processing, information retrieval and machine learning to arrive at a conclusion. NLP systems have been developed that are able to understand complex questions input to the system in natural language, and are able to answer the questions with enough precision, confidence, and speed to augment human handling of the same questions within a given environment, such as a medical inquiry and diagnostic paradigm where time-to-answer is of the essence. NLP systems often use unstructured information management architectures (UIMAs), which are component software architectures for the development, discovery, composition, and deployment of multimodal analytics for the analysis of unstructured information and its integration with search technologies developed by IBM.

In addition to determining conclusions about the presence of counterproductive interactions, decision engine 512 is also configured to recommend mitigating actions that may be taken by team leader 448. The mitigating actions may be based on known strategies for addressing the particular type of counterproductive interaction identified, as well as the identified stage of the counterproductive interaction. Alternatively, the mitigating actions may be based on particular strategies of team leader 448 for addressing the particular type of counterproductive interaction identified, as well as the identified stage of the counterproductive interaction.

Team leader station 410 receives similar data for user-B 442, user-C 444 and user-D 446 through electronic tools 404, 406, 408, respectively, and performs substantially the same analysis described above for user-B 442, user-C 444 and user-D 446. Accordingly, assessment module 432 is able to accumulate current/historical users B, C, D models 530, current/historical user A, B, C, D interactions 534, and historical user-A models 532, and provide this data to decision engine 512 for optional incorporation into the determination, preferably at the earliest stages, of whether or not user-A 440 is currently or is likely to become a target or source of a counterproductive interaction such as bullying.

A beta distribution module 514 of decision engine 512 may further augment the determinations made by decision engine 512 by evaluate the various determinations made by decision engine 512 over time. Beta distribution 514 is, in effect, a probability of probabilities such that, over time, if decision engine 512 repeatedly designates a meeting attendee as a bully, the probability range generated by beta distribution 514 converges toward a more confident number. An example beta distribution for the fundamental determination of a particular meeting attendee as a bully is illustrated by the equations shown in FIG. 9A and the distribution curve shown in FIG. 9B. Over time, if a probabilistic model (e.g., user-A model 510) designates a meeting attendee (e.g., user-A 440, user-B 442, user-C 446, user-D 448) as a bully, the number of votes goes up as shown by the equations of FIG. 9A, wherein the alpha and beta parameters in the case of bullying, can provide the average amount of times that the bullying determination made by decision engine 512 is correct. As shown by the curve of FIG. 9B, if the probability of bullying is 40%, according to the beta distribution shown, the confidence of being right is ~20% or dbeta (0.4, 200, 300). As the number of samples for beta and alpha increases, the confidence will increase. As more data is accumulated, the probability range will spike towards a more confident number.

User interface 430 and dashboard 434 display the determinations and/or mitigating strategies to team leader 448. User interface 440 and GUI/UX (not shown) include CAD, graphic, audio and video functionality that allow output of decision engine 512 to be presented to team leader 448 a variety of formats.

Figure 10:
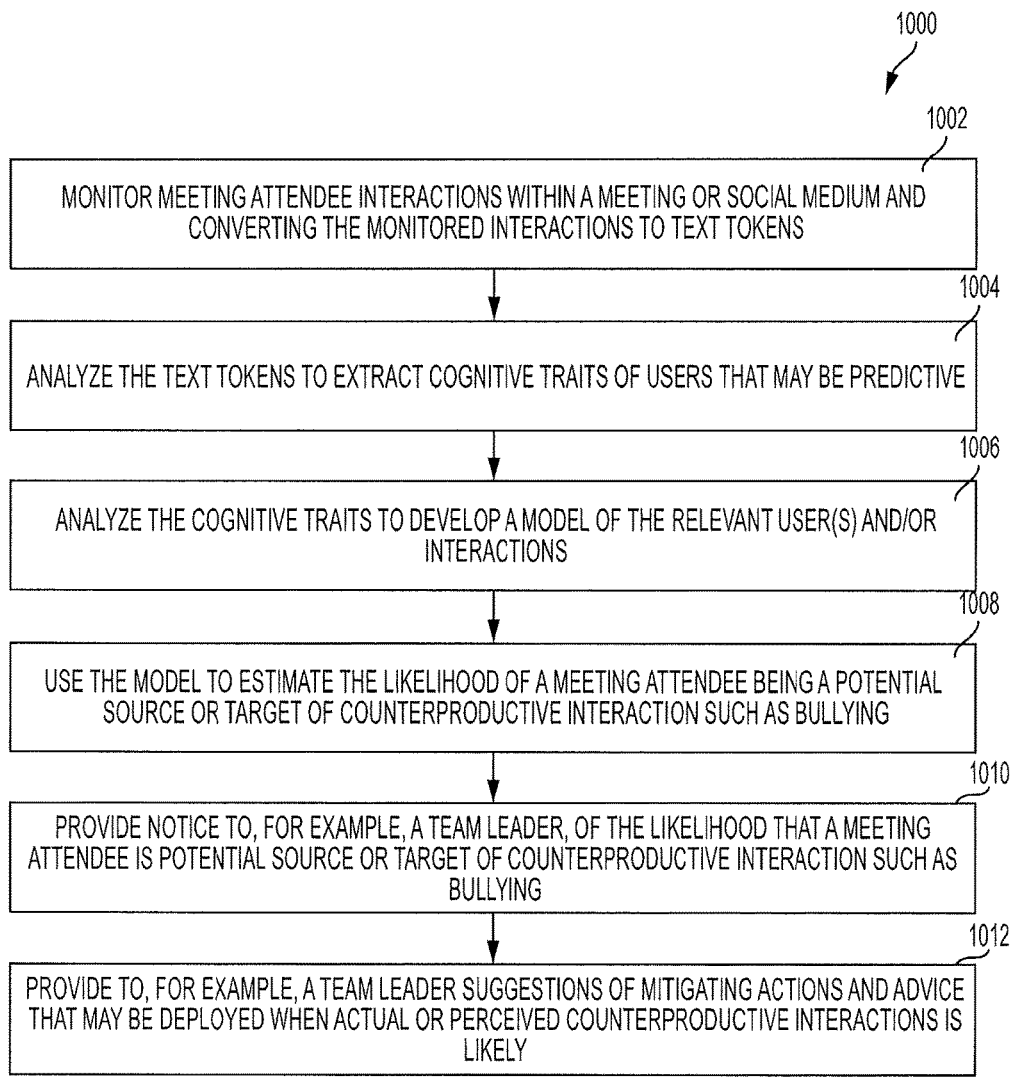
FIG. 10 depicts a flow diagram of a methodology according to one or more embodiments.

FIG. 10 depicts a flow diagram of a methodology 1000 performed by system 400 (shown in FIG. 4) according to one or more embodiments. Although the operations of methodology 1000 are illustrated in a particular order, it will be understood by persons of ordinary skill in the relevant art that the order of the illustrated operations may be changed without departing from the teachings of the present disclosure. In addition, it will be understood by persons of ordinary skill in the relevant art that one or more of the illustrated operations my omitted, and/or operations not shown may be incorporated, without departing from the teachings of the present disclosure.

Methodology 1000 begins at block 1002 by monitoring meeting attendee interactions within a meeting or social medium and converting the monitored interactions to text tokens. Block 1004 analyzes the text tokens to extract cognitive traits of users that may be predictive. Block 1006 analyzes the cognitive traits to develop a model of the relevant user(s) and/or interactions. Block 1008 uses the model to estimate the likelihood of a meeting attendee being a potential source or target of counterproductive interaction such as bullying. Block 1010 provides notice to, for example, a team leader, of the likelihood that a meeting attendee is potential source or target of counterproductive interaction such as bullying. Block 1012 provides to, for example, a team leader suggestions of mitigating actions and advice that may be deployed when actual or perceived counterproductive interactions is likely.

Thus it can be seen from the forgoing detailed description that one or more embodiments of the present disclosure provide technical benefits and advantages. Specifically, methodology 1000 and system 400 perform graphical text analysis of communications of meeting attendees in order to derive cognitive traits thereof. Meeting attendees who are likely to be the target or source of counterproductive interactions (e.g., bullying) tend to exhibit cognitive traits (e.g., high sensitivity, social withdrawal, anxiety, passivity, etc.) that can be monitored and used to model the user within a meeting or an online medium. A model of a meeting attendee is developed based at least in part on identified cognitive traits, and preventive strategies are generated in order to prevent counterproductive interactions and/or mitigate the effects of counterproductive interactions a meeting or social network.

Referring now to FIG. 11, a computer program product 1100 in accordance with an embodiment that includes a computer readable storage medium 1102 and program instructions 1104 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of identifying counterproductive interaction, the method comprising:
   receiving, using a graphical text analyzer circuit of an electronic tool, text data of a user;
   wherein the graphical text analyzer circuit comprises a graphical text analysis module communicatively coupled to a learning engine and a predictive engine;
   applying, using the graphical text analysis module of the graphical text analyzer circuit, feature extraction techniques to generate word graphs;
   wherein the feature extraction techniques comprise:
   reducing a set of behavioral measures of the user over a period of time to a set of feature nodes and vectors that correspond to representations in a lower dimensional feature space of the set of behavioral measures of the user;
   based at least in part on the learning engine receiving multiple instances of the word graphs, applying, using the learning engine, classifier training techniques to the multiple instances of the word graphs to generate and continuously refine a model of the user;
   based at least in part on the predictive engine receiving the word graphs and the model of the user, predicting, using the predictive engine, a cognitive trait of the user;
   wherein the cognitive trait of the user comprises the representations in a lower dimensional feature space of the set of behavioral measures of the user over the period of time; and
   determining, using a decision engine, based at least in part on the predicted cognitive trait of the user, that the user is a target or a source of an actual or an impending counterproductive interaction.

2. The computer implemented method of claim 1, wherein the determining that the user is a target or a source of the actual or the impending counterproductive interaction is further based at least in part on at least one of:
   a historical model of the user;
   a current model of other users;
   a historical model of other users;
   current interactions between the user and other users; or
   historical interactions between the user and other users.

3. The computer implemented method of claim 1 further comprising:
   generating, using the decision engine, based at least in part on the predicted cognitive trait of the user, an action for mitigating the actual or the impending counterproductive interaction.

4. The computer implemented method of claim 3 further comprising:
   communicating, using a user interface, to an entity the action for mitigating the actual or the impending counterproductive interaction.

5. The computer implemented method of claim 4, wherein;
   the user comprises an attendee at a team meeting; and
   the entity comprises a leader of the team meeting.

6. The computer implemented method of claim 1 further comprising:
   receiving, using another electronic tool, text data of another user;
   using the graphical text analysis module, learning engine and predictive engine of the graphical text analyzer circuit, predicting a cognitive trait of the another user based at least in part on the text data of the another user; and
   determining, using the decision engine, based at least in part on the predicted cognitive trait of the another user, that the another user is a target or source of the actual or the impending counterproductive interaction.

7. The computer implemented method of claim 6 further comprising:

generating, using the decision engine, based at least in part on the predicted cognitive trait of the user and the predicted cognitive trait of the another user, an action for mitigating the actual or the impending counterproductive interaction.

\* \* \* \* \*